United States Patent
Takahashi et al.

(10) Patent No.: US 6,929,575 B2
(45) Date of Patent: Aug. 16, 2005

(54) PULLEY

(75) Inventors: Hiroyuki Takahashi, Okazaki (JP); Atsushi Kosaka, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 204 days.

(21) Appl. No.: 10/395,054

(22) Filed: Mar. 25, 2003

(65) Prior Publication Data

US 2003/0216206 A1 Nov. 20, 2003

(30) Foreign Application Priority Data

Mar. 25, 2002 (JP) ........................................ 2002-083188

(51) Int. Cl.$^7$ .............................................. F16H 55/48
(52) U.S. Cl. ......................................... 474/161; 474/152
(58) Field of Search ................................ 474/161, 152, 474/159, 166, 178, 170, 191

(56) References Cited

U.S. PATENT DOCUMENTS

| | | | | | |
|---|---|---|---|---|---|
| 1,376,742 A | * | 5/1921 | Burnett | ........................ | 474/169 |
| 1,456,458 A | * | 5/1923 | Nordell | ........................ | 492/48 |
| 3,541,872 A | * | 11/1970 | Fix et al. | .................... | 474/263 |
| 3,666,322 A | * | 5/1972 | Pickron | ................. | 301/64.701 |
| 4,652,474 A | | 3/1987 | Kraus | | |
| 5,120,279 A | * | 6/1992 | Rabe | ........................... | 474/161 |

FOREIGN PATENT DOCUMENTS

| | | |
|---|---|---|
| DE | 2 314 000 | 9/1997 |
| JP | 07-269680 | 10/1995 |
| JP | 09-079147 | 3/1997 |

OTHER PUBLICATIONS

Mark's Standard Handbook for Mechanical Engineers, 1996, McGraw–Hill, Tenth Edition, Tables 6.12.1 and 6.1.9.*
Patent Abstracts of Japan, JP 5–248515, Sep. 24, 1993.
Patent Abstracts of Japan, JP 2001–317616, Nov. 16, 2001.

* cited by examiner

*Primary Examiner*—David A. Bucci
*Assistant Examiner*—Vicky A. Johnson
(74) *Attorney, Agent, or Firm*—Oblon, Spivak, McClelland, Maier & Neustadt, P.C.

(57) ABSTRACT

A pulley comprises a disk and an insert. The insert is fitted into the center of the disk integrally. Linear expansion coefficient of the disk is larger than the same of the insert. A concavity is formed on a periphery surface of the insert so that both side surfaces of the concavity are slanted outwardly, i.e. a distance between the side surfaces become large in proportion to being far from the centerline of the insert. When a slanting angle is defined as an angle between the side surface and a line which is perpendicular to the centerline of the insert on a plane including the centerline of the insert, the slanting angle is set from ten degrees to forty-five degrees, preferably from fifteen degrees to forty-five degrees. The disk is made of synthetic resin such as phenol resin, and the insert is made of metal such as iron.

10 Claims, 5 Drawing Sheets

PULLEY

INCORPORATION BY REFERENCE

The present application claims priority under 35 U.S.C. §119 to Japanese Patent Application No. 2002-83188, filed on Mar. 25, 2002. The contents of that application are incorporated herein by reference in their entirely.

BACKGROUND OF THE INVENTION

1. Field of the Invention

This invention relates to a pulley which is used for transmitting driving force by belt.

2. Discussion of the Background

As for a pulley which is made of synthetic resin, a metallic insert is fitted into the center portion of a disk as a main body of the pulley in order to transmit rotational driving force between the disk and a shaft. Then, it is necessary that the metallic insert is strongly secured in order to bear external force of axial direction. In order to achieve the above two purposes, i.e. to transmit the rotational driving force and to bear the external force, a first conventional metallic insert 120 shown by FIG. 1(a) has a concavity 121 which is formed on the center in the axial direction of the periphery surface of the metallic insert 120 and serrations 122 which are formed on each side of the concave 121. A second conventional metallic insert 130 shown by FIG. 1(b) has a concavity 131 and serrations 132 which are formed on the bottom surface of the concavity 131. However, it is difficult for the serrations 132 to be machined at the second conventional metallic insert 130. In contrast, a third conventional metallic insert 140 shown by FIG. 1(c) and a fourth conventional metallic insert 150 shown by FIG. 1(d) have a convexity 141, 151 which is formed on the center in the axial direction of periphery surface of the metallic insert 140, 150. Serrations 142, 152 are formed on the periphery surface of the convexity 141 at the third conventional metallic insert 140 and serrations 152 are formed on each side of the convexity 151 at the fourth conventional metallic insert 150. However, burrs produced by machining the serrations 142 damage the disk when the metallic insert 140 is fitted into the disk, and it is possible that strength of the pulley deteriorates at the third conventional metallic insert 140. It is also difficult for the serrations 152 to be machined at the fourth conventional metallic insert 150. A fifth conventional metallic insert 160 shown by FIG. 1(e) and a sixth conventional metallic insert 170 shown by FIG. 1(f) have a step 161, 171 on the periphery surface. Serrations 162, 172 are formed on a higher portion of the step 161, i.e. larger diameter portion, at the fifth conventional metallic insert 160 and formed on a lower portion of the step 171, i.e. smaller diameter portion, at the sixth conventional metallic insert 170. The fifth and sixth conventional metallic insert 160, 170 can bear the external force from one direction, however cannot bear the external force from another direction. Therefore, the first conventional metallic insert 120 is the most suitable in viewpoint of above purposes. However, as shown by FIG. 2, a left and a right side surfaces 121a of the concavity 121 are parallel each other, and synthetic resin as a material of the disk gets into and fills with the concavity 121 when the metallic insert 120 is fitted into a boss 111 of the disk 110. The synthetic resin filled into the concavity 121 is constructing a protrusion 115. Since the synthetic resin as the material for the disk 110 has linear expansion coefficient which is larger than the same of metal such as iron as the material of the metallic insert 120, the boss 111 thermally expands more than the metallic insert 120 when temperature rises. As the result, the protrusion 115 expands to directions shown by arrows Q in FIG. 2, and the side surfaces 121a of the concavity 121 work so as to restrain the expansion of the protrusion 115. That is, side surfaces of the protrusion 115 are pressed by the side surfaces 121a of the concavity 121 in directions shown by arrows P in FIG. 2. Therefore, extremely large tensile stress acts at a root of the protrusion 115 which edges E of the concavity 121 contact with. Since the tensile stress is lost when temperature drops, the protrusion 115 receive repeated load. The repeated load causes deterioration of strength of the protrusion 115 such as generation of crack in the root of the protrusion 115 during long term use.

SUMMARY OF THE INVENTION

In view of the foregoing, it is an object of the present invention to provide an improved pulley. In order to achieve the above and other objects, the pulley comprises a disk and an insert. The insert is fitted into the center of the disk integrally. Linear expansion coefficient of the disk is larger than the same of the insert. A concavity is formed on a periphery surface of the insert so that both side surfaces of the concavity are slanted outwardly.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

Figure 1:
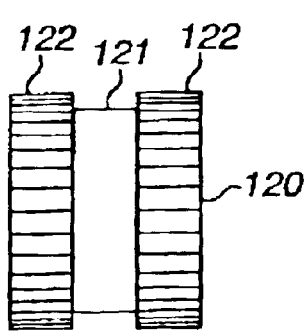
FIGS. 1(a) to (f) are side views of conventional metallic inserts.
Figure 1:
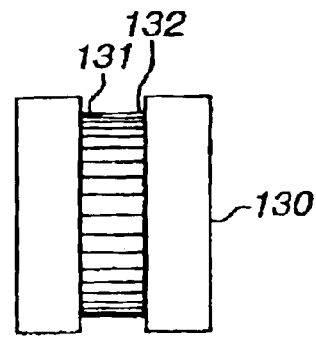
Figure 1:
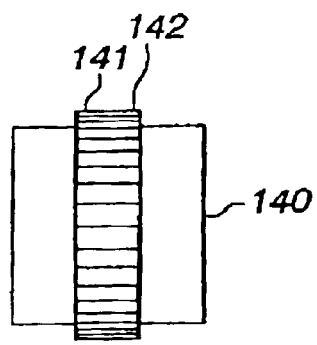
Figure 1:
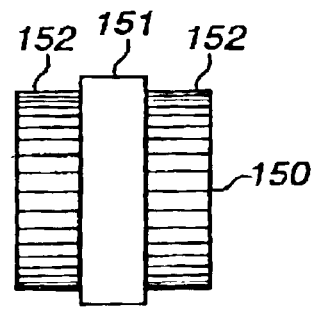
Figure 1:
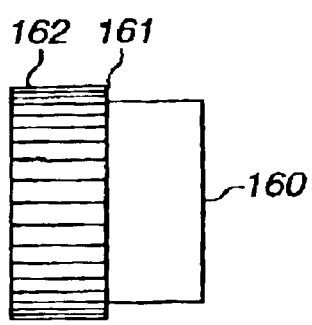
Figure 1:
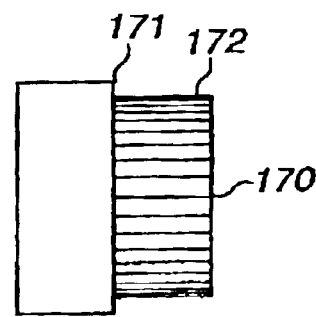
Figure 2:
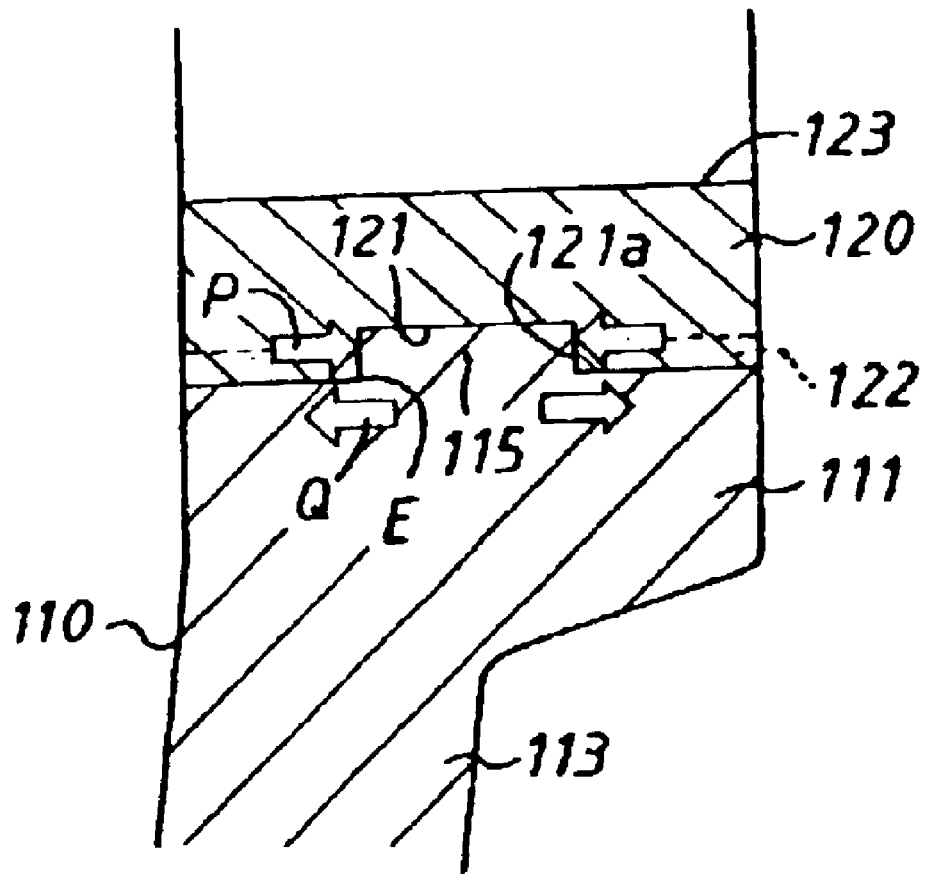
FIG. 2 is a partial cross-sectional view of a first conventional metallic insert shown by FIG. 1(a)
Figure 3:
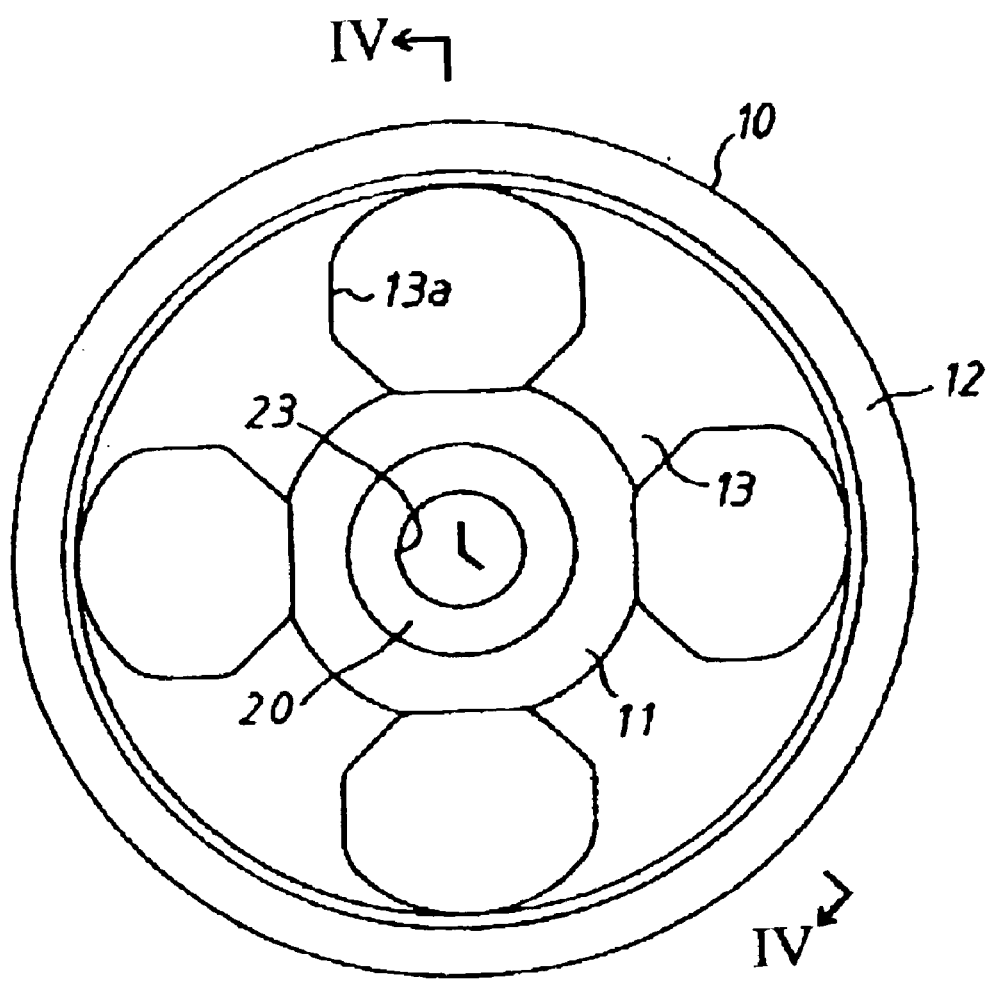
FIG. 3 is a front view of a pulley according to an embodiment of the present invention.
Figure 4:
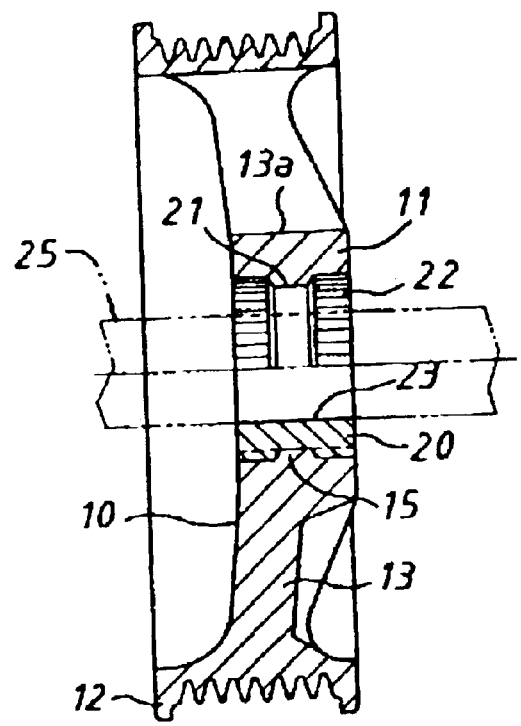
FIG. 4 is a cross-sectional view along IV—IV of FIG. 3.

Embodiment of the present invention will be described with reference to the drawings. As shown by FIG. 3 and FIG. 4, a pulley 10 as the embodiment of the present invention comprises a disk 10 as a main body and an insert 20 which is coaxially fitted into the center of the disk 10. The disk 10 is a molding product made of synthetic resin such as phenol resin and comprises a boss 11 and a rim 12 which are coaxially disposed each other. V-shape grooves on which a belt is engaged are formed on periphery surface of the rim 12. The disk 10 also comprises a connecting portion 13 which is connecting the boss. 11 and a rim 12. Plural holes 13a are formed in the connecting portion 13 in order to lighten in itself. The insert 20 which is made of metal such as iron or steel has a ring shape. A concavity 21 is formed on the periphery surface of the insert 20 at the center portion in the axial direction in order to secure the insert 20 to the disk 10 in the axial direction. Serrations 22 are also formed on the periphery surface of the insert 20 at both sides of the concavity 21 in order to secure the insert 20 to the disk 10 in the rotational direction. A key groove or serrations (not shown) are formed on the inner surface of a center hole 23 of the insert 20 in order to transmit rotational driving force between the insert 20 and a shaft 25 which is fitted into the center hole 23.

Both side surfaces 21a of the concavity 21 are slanted so that a distance between the side surfaces 21a become large gradually in proportion to being far from the centerline of the insert 20. When a slanting angle θ is defined as an angle between the inside surface 21a and a line which is perpendicular to the centerline of the insert 20 on a plane including the centerline of the insert 20, the slanting angle θ is set in thirty degrees (30°) at this embodiment. The insert 20 is coaxially inserted into the center of the boss 11 and integrated with the disk 10, when the disk 10 is formed by an injection molding or a compression molding. Then a part of synthetic resin as the material of the disk 10 comes into the concavity 21 and forms an annular protrusion 15. The protrusion 15 functions so as to prevent that the insert 20 falls out from the disk 10 by external force in axial direction. A part of synthetic resin also gets into the serrations 22 and therefore rotational driving force can be transmitted between the insert 20 and the disk 10. Since the inside surfaces 21a of the concavity 21 are slanted, each edge E of the concavity 21 and a root of the protrusion 15 become an obtuse angle. It is preferable that chamfering such as radius chamfering is executed at the edges E.

Figure 5:
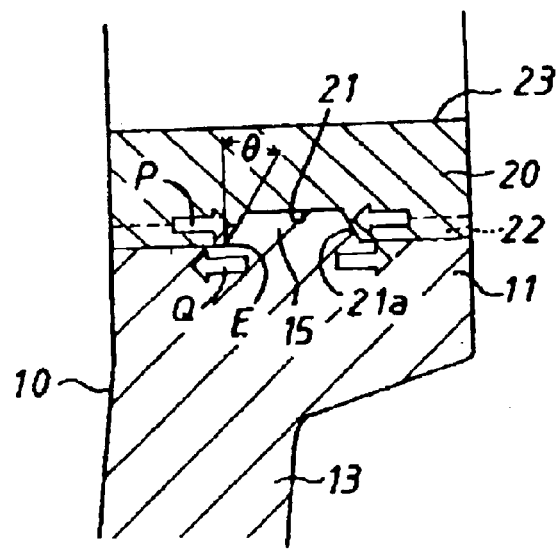
FIG. 5 is a partial enlarged view of FIG. 4.

At the aforementioned pulley, since linear expansion coefficient of the disk 10 (Linear expansion coefficient is over 30×10⁻⁶/° C. in a case that phenol resin is used for the disk 10.) is larger than the same of the insert 20 (Linear expansion coefficient is 11.7×10⁻⁶/° C. in a case that iron is used for the insert 20.), the disk 10 thermally expands more than the insert 20. Therefore, when temperature rises the protrusion 15 extremely expands in a direction shown by arrows Q in FIG. 5 larger than the concavity 21. As the result, the side surfaces 21a work so as to restrain the expansion of the protrusion 15 in the direction of the arrows Q, and side surfaces of the protrusion 15 are pressed in a direction shown by arrows P by the side surfaces 21a. Then, because the side surfaces 21a are slanted, the force that the side surfaces 21a press the outer side surfaces of the protrusion 15 is relieved. That is, the expansion of the protrusion 15 which is larger than the same of the insert 20 is absorbed by sliding between the side surfaces 21a of the concavity 21 and the side surfaces of the protrusion 15, so the pressure acting between the side surfaces 21a and the side surfaces of the protrusion 15 is released. Therefore, tensile stress acting at the root of the protrusion 15 is significantly reduced in comparison with the case of the first related art, i.e. the slanting angle θ is zero degree (0°).

Further, since the root of the protrusion 15 formed as obtuse angle, a stress concentration occurring by a notch effect at the root of the protrusion 15 is also moderated. Since the tensile stress is lost when temperature drops, the root of the protrusion 15 receives repeated load. However, the tensile stress is significantly reduced, so it is prevented that strength of the root of the protrusion 15 deteriorates or that crack is generated.

Figure 6:
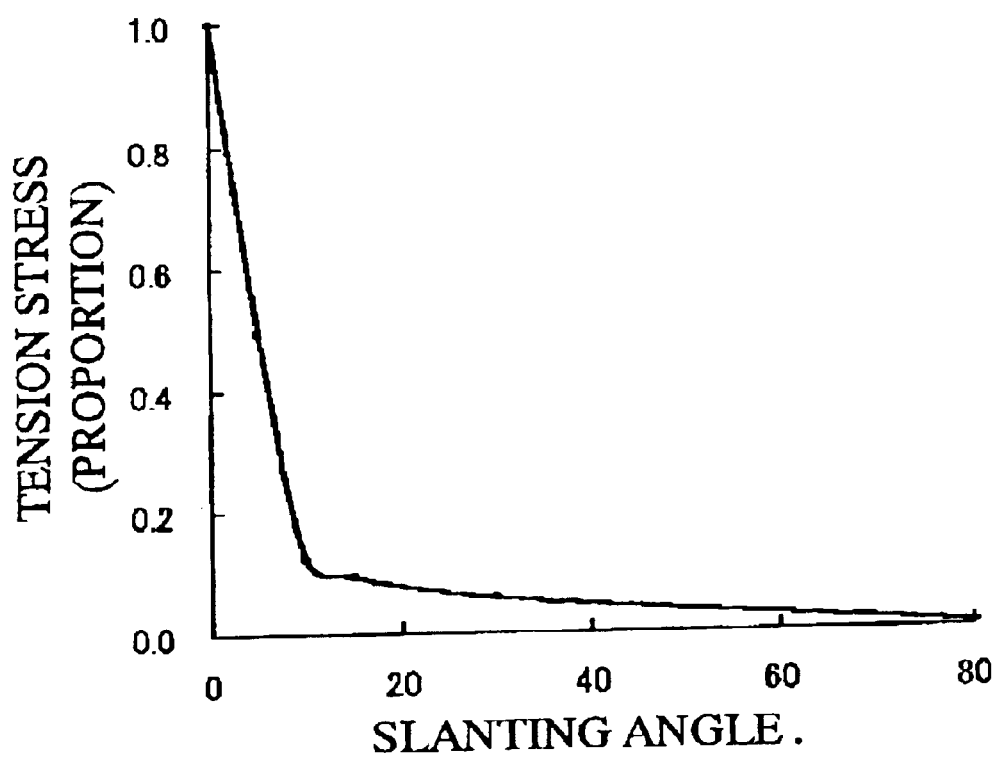
FIG. 6 is a graph showing a relationship between slanting angles and tensile stresses.

Table 1 and FIG. 6 show an analysis result by FEM (finite element method) for confirming that the tensile stress is reduced. At the analysis, when circumstance temperature rose from 20° C. to 130° C., the tensile stresses occurring at the root of the protrusion 15 were analyzed depending on the slanting angle θ. Specifications of the analysis are as follows:

External diameter of the disk (Phenol resin); 135 mm
External diameter of the insert (iron); 26.5 mm
The slanting angles of the side surface; 0°, 5°, 10°, 15°, 30°

Now, the tensile stresses are expressed in proportion with the same of which the slanting angle θ is zero degree (0°).

TABLE 1

| Slanting angle θ (Degree) | 0° | 5° | 10° | 15° | 30° |
|---|---|---|---|---|---|
| Tensile stress (Proportion) | 1.000 | 0.496 | 0.121 | 0.094 | 0.058 |

As shown by Table 1 and FIG. 6, the tensile stress acting at the root of the protrusion 15 in the case that the slanting angle θ is five degrees (5°) decreased to 0.496 which is less than half in comparison with the case that the slanting angle θ is zero degree (0°). In a case that the slanting angle θ is ten degrees (10°), it decreased to 0.121 which is less than one-eighth. In a case that the slanting angle θ is fifteen degrees (15°), it decreased to 0.094 which is less than one-tenth. It further decreased to 0.058 in a case that the slanting angle θ is thirty degrees (30°). That is, the tensile stress decreased like an exponential function depending on the incremental of the slanting angle θ.

According to the result of the analysis, since the tensile stress acting at the root of the protrusion 15 decreases to less than one-eighth in the case that the slanting angle θ of the side surfaces 21a is equal or more than ten degrees (10°), problems that the strength of the root of the protrusion 15 deteriorates or that crack is generated are practically prevented. Further, since the tensile stress decreases to less than one-tenth in the case that the slanting angle θ is equal or more than fifteen degrees (15°), these problems are almost perfectly prevented.

In the aforementioned embodiment, phenol resin is used for material of the disk 10 and iron is used for material of the insert 20. However, the present invention is effective in a case that other materials such as polyamide resin or polyoxymethylene (POM) resin are used for the disk 10 and that other materials such as steel are used for the insert 20, if linear expansion coefficient of the disk 10 is larger than the same of the insert 20.

Obviously, numerous modifications and variations of the present invention are possible in light of the above teachings. It is thereby to be understood that within the scope of the appended claims, the present invention may be practiced otherwise than as specifically described herein.

What is claimed is:

1. A pulley comprising:

a disk; and an insert fitted into the center of the disk integrally, wherein linear expansion coefficient of the disk is larger than the same of the insert, and a concavity is formed on a periphery surface of the insert so that both side surfaces of the concavity are slanted outwardly at an angle of at least ten degrees.

2. A pulley according to claim 1, wherein the side surfaces are slanted so that a distance between the side surfaces become large in proportion to being far from the centerline of the insert.

3. A pulley according to claim 2, wherein when a slanting angle is defined as an angle between the side surface and a line which is perpendicular to the centerline of the insert on a plane including the centerline of the insert, the slanting angle is set from ten degrees to forty-five degrees.

4. A pulley according to claim 2, wherein when a slanting angle is defined as an angle between the side surface and a line which is perpendicular to the centerline of the insert on a plane including the centerline of the insert, the slanting angle is set from fifteen degrees to forty-five degrees.

5. A pulley according to claim 1, wherein serrations are formed on the periphery surface of the insert by both sides of the concavity.

6. A pulley according to claim 1, wherein an edge of the concavity is chamfered.

7. A pulley according to claim 1 wherein the disk is made of synthetic resin.

8. A pulley according to claim 7, wherein the synthetic resin is one of phenol resin, polyamide resin and polyoxymethylene resin.

9. A pulley according to claim 1, wherein the insert is made of metal.

10. A pulley according to claim 9, wherein the metal is one of iron and steel.

* * * * *